E. A. CONKLIN.
HARROW.
APPLICATION FILED MAR. 29, 1909.
944,415.
Patented Dec. 28, 1909.
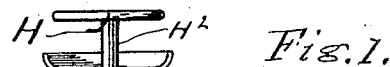
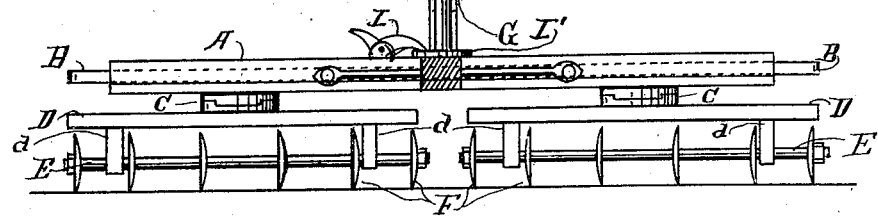
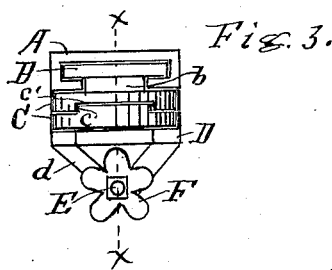
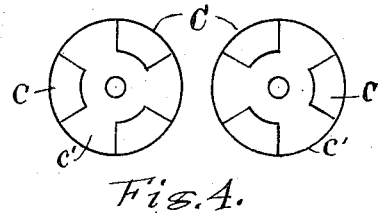
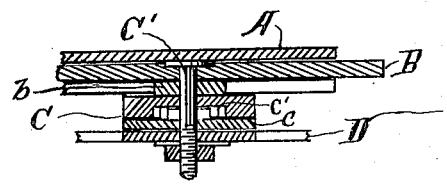
Witnesses
H. A. Luten
R. L. Williams
Inventor
Ethan A. Conklin
By
Idriel J. Cilley
Attorney

UNITED STATES PATENT OFFICE.

ETHAN A. CONKLIN, OF SHELBY, MICHIGAN, ASSIGNOR OF ONE-HALF TO WESLEY GRAHAM, OF HARRISON VALLEY, PENNSYLVANIA, AND AMOS M. CONKLIN, OF GRANT, MICHIGAN.

HARROW.

944,415.   Specification of Letters Patent.   Patented Dec. 28, 1909.

Application filed March 29, 1909. Serial No. 486,613.

*To all whom it may concern:*

Be it known that I, ETHAN A. CONKLIN, a citizen of the United States, residing at Shelby, in the county of Oceana and State of Michigan, have invented certain new and useful Improvements in Harrows, of which the following is a specification.

My invention relates to improvements in disk harrows, and its objects are: First, to provide a harrow of the class mentioned, with which the disks may be readily adjusted to make the land harrowed wider or narrower, as may be necessary to accommodate the harrow to the distance between trees when harrowing is being done in orchards, or on stumpy ground, &c., and, second, to provide a means whereby the disks may be readily set to any desired angle with the supporting frame.

I attain these objects by the mechanism illustrated in the accompanying drawing, in which—

Figure 1 is a front elevation of the harrow with the tongue shown in cross section. Fig. 2 is a top plan of the same. Fig. 3 is an end elevation of the same. Fig. 4 shows the face formation clamping disks that hold the auxiliary harrow frames in place, and Fig. 5 is a sectional elevation on the line $x$ $x$ of Fig. 3.

Similar letters refer to similar parts throughout the several views.

In the accompanying drawing A represents the harrow frame proper, which is provided with a seat G, and is so constructed as to form ways in which the slides B B may be supported and readily moved longitudinally of the frame A, either to extend or to contract the machine. The slides B B are provided with gear teeth $h$ $h$, so located that they will mesh freely with the gear teeth on the wheel H' that when the gear wheel is made to revolve in one direction the slides B B will be forced apart and the width of ground covered by the disks will be increased, and when the wheel is made to revolve in the other direction the slides will be drawn together and the width of ground covered will be diminished accordingly. The wheel H' is manipulated by means of the hand wheel H, mounted on the shaft $H^2$ which is easily accessible to the operator when seated on the seat G, and, when desired, the operator may keep the slides under perfect control, to be extended or withdrawn at pleasure, so that when harrowing in orchards where the distance between trees varies, or among stumps, the harrow may be instantly adjusted to accommodate it to the varied distances and conditions.

For the purpose of securing the auxiliary disk frames D D to the slides B B, in such a manner that they may be given different angles to the frame A, I secure supporting blocks $b$ $b$ firmly to the lower surface of the slides and to these I secure one disk of a clutch C. The other disk of this clutch is firmly secured to the upper surface of the auxiliary frames D D, and the two are brought together so that the projections C will enter the depressions $c'$ of the opposite disk, and the whole is secured together by means of any suitable bolt, as C', so that the auxiliary frames D D will be firmly held to position whether parallel with the frame A or at any desired angle therewith. The clutches C C may be made with as many or as few depressions, $c'$, and elevations, $c$, as desired so that the disk shaft and frame may be set at any desired angle with the frame A, for the purpose of cutting the soil in as few or as many particles as is desired, or, in other words, of pulverizing it to the desired degree.

The disk shafts E E are supported in the hangers $d$ $d$ which, in turn, are secured to the auxiliary frames D D so that the disk shafts are made to assume any position assumed by the said frames.

In Fig. 2 I have removed the upper portion of the frame A to show the relative position, and the action of the gear wheel H' and the slides B B.

In Fig. 3 I have shown the disk made with five wings, a form that is more desirable that the plain disks shown in Fig. 1 as they cut the soil much more perfectly, and leave the surface more perfectly pulverized and tillable.

The slides B B may be held to place by means of a pawl, as I, engaging a ratchet wheel, as I', or by any other available form of securing device, if desired.

What I claim as new, and desire to secure by Letters Patent of the United States, is:

The combination in a harrow, of a main frame having longitudinal parallel grooves that open toward each other, slides fitted to slide in opposite directions in said grooves, gear teeth on said slides, a gear wheel and an actuating wheel for actuating said slides, one half of a clutch secured to the under surface of each of said slides, auxiliary frames, one half of a clutch secured to the upper surface of each auxiliary frame in position to engage the half clutch on the slides, to hold the auxiliary frames to the desired angles, with the main frame, a shaft mounted on each auxiliary frame, and harrow disks mounted on said shafts.

Signed at Shelby Michigan March 15 1909.

ETHAN A. CONKLIN.

In presence of—
C. L. CHURCHILL,
SAMUEL BUCHER.